United States Patent [19]

Song

[11] Patent Number: 5,528,916
[45] Date of Patent: Jun. 25, 1996

[54] DEVICE FOR SECURING OBJECTS ON A RING

[76] Inventor: Chang J. Song, 6740 Comstock Road, Richmond, British Columbia, Canada

[21] Appl. No.: 49,046

[22] Filed: Apr. 16, 1993

[51] Int. Cl.[6] .................................................. A44B 15/00
[52] U.S. Cl. ......................... 70/459; 24/598.3; 70/456 R
[58] Field of Search ................................ 70/459, 456 R, 70/460; 24/598.3, 3.6; 206/37.1, 37.4, 37.5, 37.6, 37.8, 38.1

[56] References Cited

U.S. PATENT DOCUMENTS

| 293,693 | 2/1884 | West | 70/459 |
|---|---|---|---|
| 368,135 | 8/1887 | Crandall | 70/459 |
| 3,478,550 | 11/1969 | Salvesen | 70/459 |

FOREIGN PATENT DOCUMENTS

| 1257187 | 2/1961 | France | 70/459 |
|---|---|---|---|
| 318207 | 1/1920 | Germany | 70/459 |
| 2852039 | 9/1979 | Germany | 70/459 |
| 193714 | 3/1923 | United Kingdom | 70/459 |

*Primary Examiner*—Lloyd A. Gall
*Attorney, Agent, or Firm*—Townsend and Townsend and Crew

[57] ABSTRACT

A device for securing objects on a ring includes a ring having a gap. A closing mechanism includes a guide tube for receiving the ring. In the unlocked position, the closing mechanism slides along a circumference of the ring exposing the gap. Objects may then be placed on the ring. In the locked position, the gap is contained within the guide tube and biasing device locks the closing mechanism in place.

7 Claims, 4 Drawing Sheets

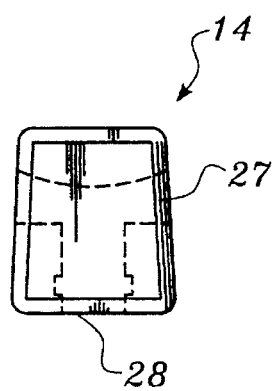
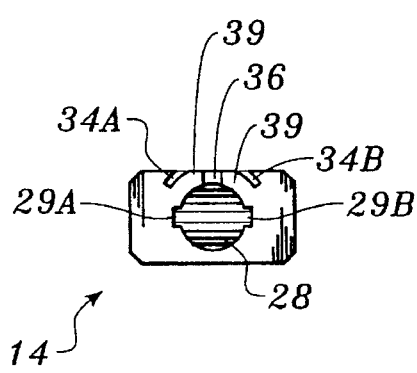
FIG. 2A.     FIG. 2B.
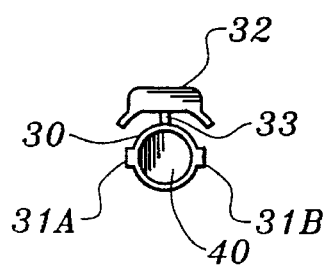
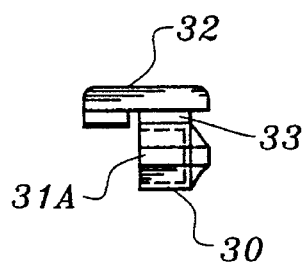
FIG. 2C.     FIG. 2D.
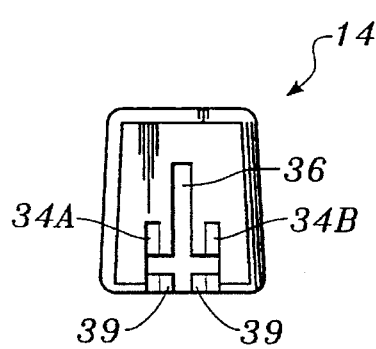
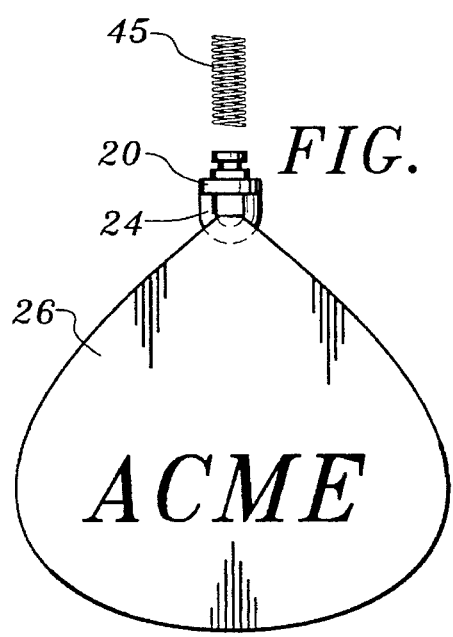
FIG. 2E.     FIG. 2F.

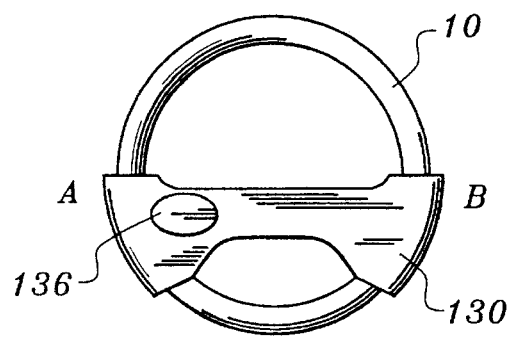 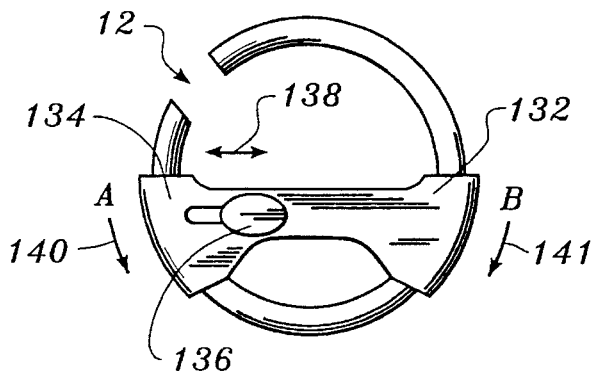
*FIG. 3A.*   *FIG. 3B.*
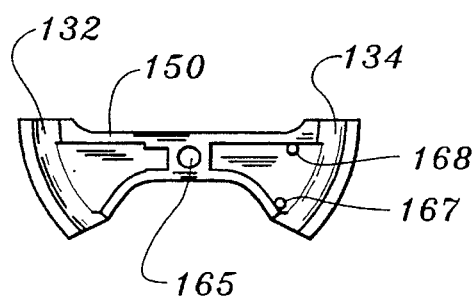 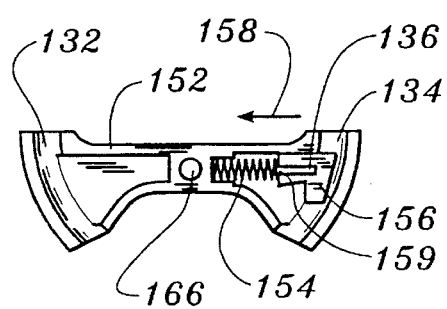
*FIG. 4A.*   *FIG. 4B.*

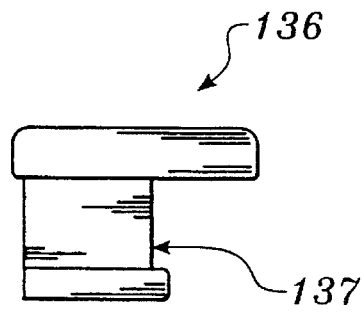
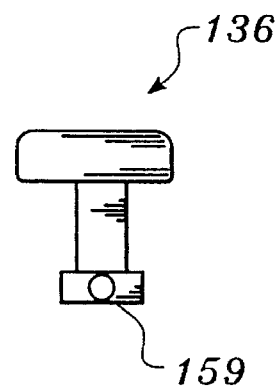
FIG. 5A.  FIG. 5B.
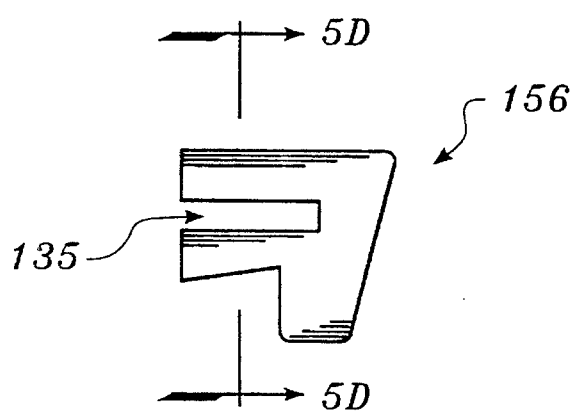
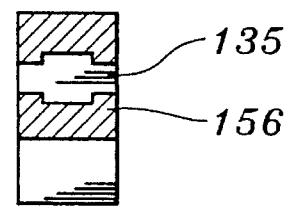
FIG. 5C.  FIG. 5D.

DEVICE FOR SECURING OBJECTS ON A RING

BACKGROUND OF THE INVENTION

The present invention relates to a mechanism for closing a ring such as a key ring or jewelry clasp.

Many types of ring securing devices are presently in existence. For example, one common ring securing device is the split key ring onto which keys are threaded. The split key ring reliably secures keys, however, the keys are difficult; to thread on and off the ring and injury to the fingernails frequently results.

Various other mechanisms for securing devices on a retaining ring have therefore been developed. These devices typically include some form of bulky clasp which may be difficult to place in a confined space such as a pocket. Furthermore, these devices can be difficult to manipulate or may not reliably secure the item on the ring.

SUMMARY OF THE INVENTION

The present invention provides a mechanism for opening and closing a ring securing device and for effectively storing objects on a ring.

According to one embodiment of the present invention, the ring includes a gap. A closing mechanism includes a guide tube for receiving the ring. In the unlocked position, the closing mechanism slides along a circumference of the ring exposing the gap. Objects may then be placed on the ring. In the locked position, the gap is contained within the guide: tube and a biasing means locks the closing mechanism in place.

According to another embodiment of the present invention., the closing mechanism is free to rotate about a centerline axis of the ring when in the closed position. This feature reduces the bulk of the securing device and allows it to be folded for compact storage.

According to yet another embodiment of the present invention, the closing mechanism spans a chord defined by the outer edges of the ring. The ring travels through a guide tube located at each end of the spanned chord. In the closed position, the ring gap resides inside one of the guide tubes. A biasing means retains the closing mechanism in the closed position. The biasing means is released to slide the closing mechanism along the circumference of the ring and to expose the gap.

BRIEF DESCRIPTION OF THE DRAWINGS

FIG. 2A is a front view of a closing device for the ring of FIGS. 1A–1C;

FIG. 2B is an end view of the closing device of FIG. 2A;

FIG. 2C is an end view of a stop mechanism contained within the closing device of FIGS. 2A and 2B;

FIG. 2D is a side view of the stop mechanism of FIG. 2C;

FIG. 2E is a top view of the closing device of FIGS. 2A and 2B;

FIG. 2F is a drawing of a closing device biasing means according to an embodiment of the present invention;

FIG. 3A is a top view of a ring securing device in the closed position according to an alternate embodiment of the present invention;

FIG. 3B is a top view of the ring securing device of FIG. 3B in the open position; and FIG. 4A is a view of the back of the ring securing device of FIGS. 3A and 3B.

FIG. 4B is a view of the top of the ring securing device of FIGS. 3A and 3B.

FIG. 5A is a side view of the latch assembly of FIG. 4;

FIG. 5B is an end view of the latch assembly of FIG. 4;

FIG. 5C is a top view of the stop assembly of FIG. 4; and

FIG. 5D is a sectional view of the stop assembly of FIG. 4.

DESCRIPTION OF THE PREFERRED EMBODIMENT

Figure 1A:
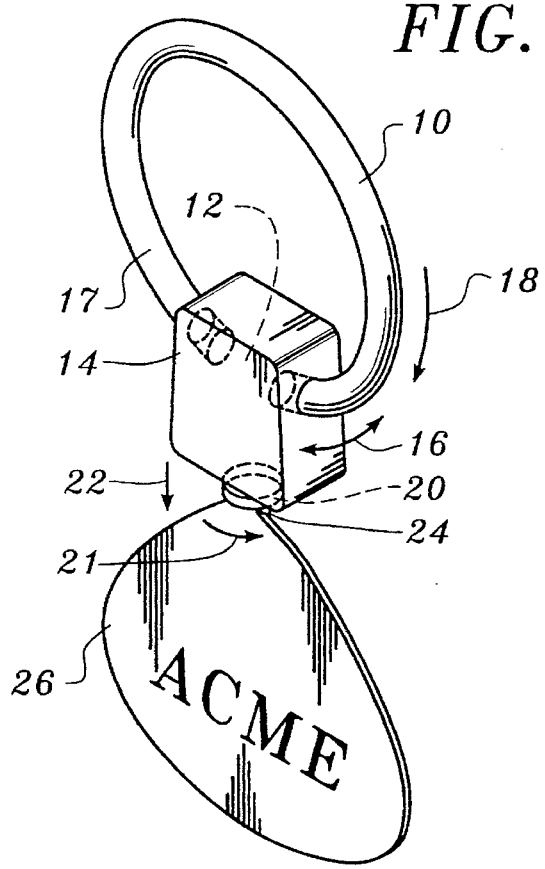
FIG. 1A is a perspective view of a ring securing device according to an embodiment of the present invention.
Figure 1B:
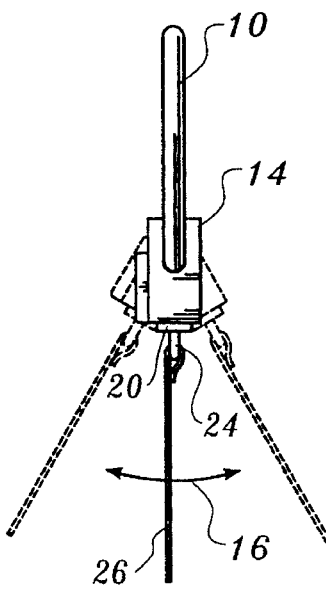
FIG. 1B is a side end view of the ring securing device of FIG. 1A.
Figure 1C:
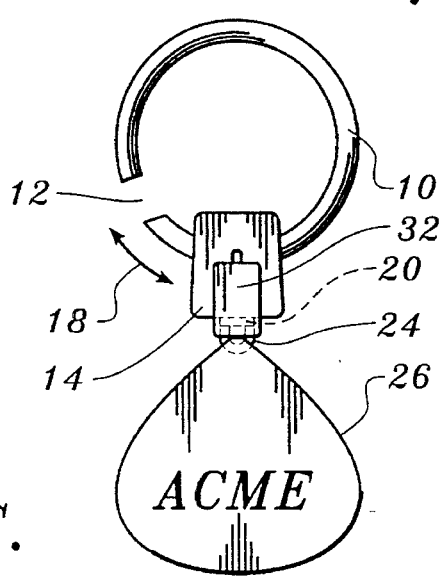
FIG. 1C is a view of the ring securing device of FIGS. 1A and 1B in the open position.

FIGS. 1A–1C show one embodiment of a ring securing device according to an embodiment of the present invention. Throughout the drawings, a key ring is shown. However, the invention is not limited to key rings and is applicable to any device in which a ring is used as a retaining/securing element. Similarly the ring need not be circular.

The device of FIGS. 1A–1C includes a ring securing element 10. Ring securing element 10 does not form a closed ring, but instead includes a gap 12. During normal use, gap 12 is closed by a closing device 14 to prevent the items retained on the ring from slipping off the ring.

Closing device 14 is pivotally connected to ring 10 such that during normal use, device 14 can pivot through an arc 16 about a centerline axis 17 of ring 10. Thus, the entire mechanism can be carried easily in a compact space such as a pocket without undesired bulk. When closed, device 14 cannot, however, normally move around the circumference of ring 10 in the direction shown by arrow 18.

To add or remove keys from ring 10, a button tab 32 is pushed in the direction of arrow 22. A button 20 may rotate about the vertical axis in the direction of arrow 21. The device is thus less rigid and is better able to be folded or maneuvered into a confined space. Button 20 may optionally include a loop 24 for attaching a tag, an insignia, additional key ring or other secondary device 26. Depressing button tab 32 releases closing device 14 so that it is permitted to slide around the circumference of ring 10. As shown in FIG. 1C this action exposes gap 12 so keys can be added or removed from ring 10. When device 14 returns to the closed position, the locking mechanism, automatically snaps back into place to retain device 14 in the closed, or locked, position.

FIGS. 2A–2F are drawings showing the component pieces of the closing device in greater detail. FIG. 2A is a front view of device 14. Device 14 may be fabricated from two cast pieces joined together by one or more rivets 13. Optionally, device 14 may be formed from a single cast piece. Device 14 includes a guide tube 27 through which ring 10 passes. Tube 27 allows ring 10 to freely pass through the device 14 without the edges of ring 10 near gap 12 getting caught or hung up. Tube 27 therefore serves as a guide for ring 10 and insures ease of operation.

Intersecting with guide tube 27 is an end hole 28. FIG. 2B is an end view of device 14 showing the details of end hole 28. Two guide slots 29a and 29b are located adjacent end hole 28. A stop 30 fits into passageway 28 and is guided along by projections 31a and 31b which mate with slots 29a and 29b of device 14. A button tab 32 attaches to stop 30 via a spar 33. A side view of the component of FIG. 2C is shown in FIG. 2D. The button assembly 32 mates with recesses 34a and 34b of device 14 shown in FIG. 2B. Spar 33 is located in region 36 of FIG. 2B. FIG. 2E is a top view of device 14 showing the locations of the guide slots for the assembly of FIG. 2C.

As shown in FIG. 2C, stop 30 contains a receptacle 40 for receiving the end piece that contains button 20. FIG. 2F shows the construction of the end piece in detail. The end piece also includes a spring 45 to serve as a biasing means for stop 30.

In operation, the assembly of FIG. 2C is mated with the end piece assembly of FIG. 2F. The resulting structure is inserted into device 14 such that stop 30 rests in ring gap 12 located at the intersection of end hole 28 and tube 27 of FIG. 2A. Projections 31a and 31b maintain stop 30 in position when the device is closed. Otherwise, ring 10 might slide on device 14 and open enough of a gap for a key to fall off the ring. The ring securing device is thus closed, and the closing mechanism cannot travel along the circumference of ring 10. To open the ring, the user depresses button tab 32 to release the biasing force on stop 30. The stop assembly can then slide down end hole 28 and away from tube 27. Ring 10 can then freely pass through guide tube 27 until the gap is exposed.

The mechanism of FIGS. 2A–2F may be simply and economically assembled. The stop mechanism of FIG. 2C is simply inserted through the end hole followed by the end piece with optional part 26. The collar segments 39 can then be crimped to complete the assembly.

FIGS. 3A–3B show an alternate embodiment of a ring securing mechanism according to the present invention. The embodiment of FIG. 3 also contains a ring 10 having a gap 12. FIG. 3A shows the mechanism secured in the closed position by a ring closing device 130. Device 130 spans chord AB of ring 10 and includes two guide tubes 132 and 134 through which ring 10 passes. Dividing the circle of the key ring into two sections for retaining keys allows separation of one or more keys from others so that the keys most often used are easier to locate. Also, the separation allows collection of keys in one compartment and then allows attachment of key ring to another item by the second compartment. This allows attachment of key ring to a belt loop, for example, by one compartment and retains keys in the second compartment. Device 130 is held in the closed position by a spring biased stop (not shown in FIG. 3A). Thus, during normal use, device 130 remains in position and the items retained on ring 10 remain securely on the ring.

To open the securing mechanism, the user moves a latch 136 in the direction of arrow 138 to release device 130. Device 130 may then be slid along ring 10 in either direction 140 or 141 as shown in FIG. 3B. Sliding device 130 exposes gap 12 and enables items to be slid on and off ring 10.

FIG. 4 shows the construction of closing device 130 in greater detail. Closing device 130 is shown as cast in two pieces 150 and 152. Piece 152 of device 130 includes a spring 154 attached to a stop 156. When the assembly is in the closed position, stop 156 extends into guide tube 134 and occupies gap 12. In this position, stop 156 prevents closing device 130 from traveling about the circumference of the ring. Latch 136 contains a tongue 137 which mates with recess 135 of stop 156. When latch 136 is moved in the direction of arrow 138, spring 154, which is secured to latch 136 via projection 159, moves in the direction of arrow 158. Stop 156 no longer resides within guide tube 134 or gap 12. Closing device 130 is thus free to rotate about ring 10. FIGS. 5A–5D shows the details of the latch/stop assembly described above.

Device 130 may be constructed for easy assembly. Piece 150 contains a projection 165 which is received into recess 166 of matching piece 152. Similarly, piece 152 contains projections 167 and 168 for receipt into corresponding recesses of piece 150. The parts are crimped together. Thus, the part may be easily assembled without complex machinery or skilled labor.

Preferred embodiments of the invention have now been described. Variations and modifications will be readily apparent to those of ordinary skill in the art. For these reasons, the invention should be construed in light of the claims.

What is claimed is:

1. A method for securing an object comprising the steps of:

placing the object on a noncontinuous ring having a gap therein;

sliding said ring within a substantially continuous guide tube of a closing mechanism until said gap is contained within said guide tube and is no longer exposed, said guide tube allowing said ring to freely pass within said closing mechanism, said closing mechanism formed from two cast pieces riveted together to form a substantially rectangular body; and locking said closing mechanism in place with a biasing means, said biasing means having a spring placed between a stop and an end piece, said end piece rotatably connected to said closing mechanism and having a fixed loop formed thereon, said closing mechanism further comprising a button slidably mounted on a surface of said substantially rectangular body.

2. A device for securing objects comprising:

a ring having a gap therein;

a closing apparatus formed from two separate pieces riveted together to form a substantially rectangular shape, and having:
   a first and a second opening for accommodating passage of said ring;

a substantially continuous guide tube, extending between said first and second openings, for receiving and guiding said ring freely through said closing apparatus;

a latching mechanism having a latched and unlatched position, said latching mechanism having a stop piece biased by a spring coupled to a button mounted on a face of said closing apparatus;

an end piece assembly rotatably connected to said closing apparatus, said assembly having a fixed loop for attaching exterior devices;

wherein when said latching mechanism is in the unlatched position, said closing apparatus is free to move along a circumference of said ring; and wherein when said latching mechanism is in the latched position, said closing apparatus is prevented from moving along said circumference of said ring.

3. The device of claim 2 wherein said guide tube has a length greater than a length of said gap.

4. A device for securing objects comprising:

a ring having a gap therein;

a closing mechanism having a first and a second opening for accommodating passage of said ring, said closing mechanism formed from two cast pieces riveted together to form a substantially rectangular body, a substantially continuous guide tube extending between said first and second openings, for receiving and guiding said ring freely through said closing mechanism, said closing mechanism further including:

a stop;

means, coupled to said stop, for biasing said stop within said guide tube when said guide tube is aligned with said gap;

a latch slidably disposed on a surface of said closing mechanism, coupled to one of said means for biasing or said stop, for releasing said stop and wherein said closing mechanism is free to travel around a circumference of said ring; and an end piece assembly rotatably connected to an end of said closing mechanism, said end piece assembly having a fixed loop for attaching exterior devices.

5. The device of claim 4 wherein when said stop is maintained in said gap, said closing mechanism is free to rotate around a centerline axis of said ring.

6. The device of claim 4 wherein said means for biasing is rotatable.

7. The device of claim 4 wherein said guide tube has a length greater than a length of said gap.

* * * * *